Figure 1:
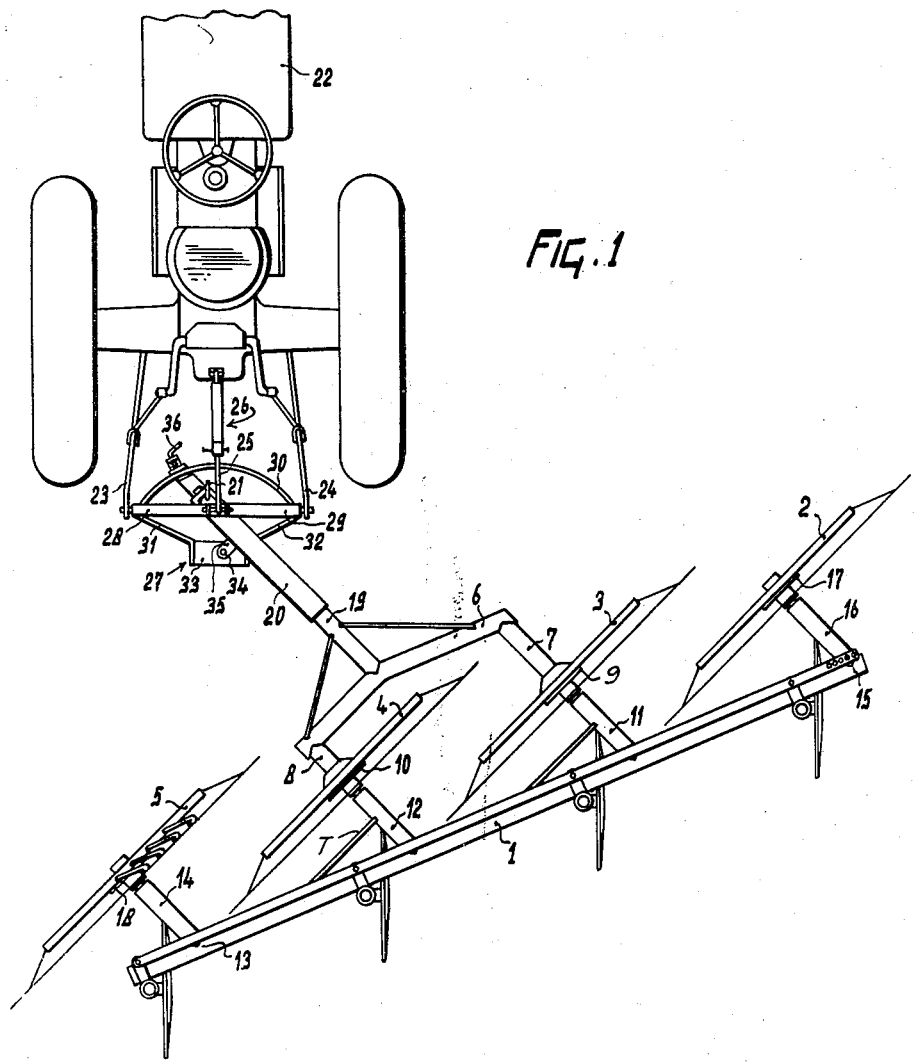

Sept. 24, 1963    C. VAN DER LELY ETAL    3,104,512
IMPLEMENT FOR LATERALLY DISPLACING MATERIAL LYING ON THE GROUND
Original Filed May 28, 1956

United States Patent Office 3,104,512
Patented Sept. 24, 1963

---

3,104,512
IMPLEMENT FOR LATERALLY DISPLACING MATERIAL LYING ON THE GROUND
Cornelis van der Lely, Zug, Switzerland, and Ary van der Lely, Maasland, Netherlands, assignors to C. van der Lely N.V., Maasland, Netherlands, a limited liability company of the Netherlands
Original application May 28, 1956, Ser. No. 587,639, now Patent No. 2,926,476, dated Mar. 6, 1959. Divided and this application Jan. 27, 1960, Ser. No. 4,901
2 Claims. (Cl. 56—377)

This invention relates to an implement for laterally displacing material lying on the ground and of the type which comprises rake wheels.

This application is a division of application Serial No. 587,639, filed May 28, 1956, and now Patent No. 2,926,476.

It is known to provide said implements with cranks, whereon the rake wheels are mounted. It is an object of the invention, however, to provide an implement, in which the rake wheels are mounted on the frame in a simple manner and wherein the rake wheels are flexible to adapt themselves to irregularities of the ground, the frame also being of a very simple construction.

In accordance with the invention there is provided an implement for laterally displacing mown grass or like material lying on the ground, the implement being of the kind comprising a row of rake wheels mounted on one side of a main frame beam, each rake wheel being positioned so as to lie obliquely to the intended direction of travel of the implement, and each being adapted to be rotated by virtue of its contact with the ground, said implement further comprising a secondary frame beam disposed on the side of the row of rake wheels opposite that on which the main frame beam is disposed, such secondary frame being held in spaced relation to said main frame beam with the aid of two interconnecting members, each of which extends through the hub of an associated rake wheel and constitutes an axle for the rotary support of such rake wheel.

For a better understanding of the invention and to show how the same may be carried into effect, reference will now be made by way of example to the accompanying drawing in which the sole FIGURE is a plan view of an implement of the kind to which the invention has been applied.

As shown in the drawing, the implement includes a main frame beam 1 and, mounted on one side of the frame beam, a row of rake wheels 2, 3, 4 and 5. On the other side of the row of rake wheels there is a secondary frame beam 6 extending transversely to the intended direction of travel of the implement and held in spaced relation to the main frame beam 1 by interconnecting members in the form of axles 7 and 8. The two axles 7 and 8 have the hubs 9 and 10 of the rake wheels 3 and 4 freely rotatably mounted thereon. Prolongations 11 and 12 of the axles 7 and 8 extend through the hubs 9 and 10 and are connected to the frame beam 1. The connections between the prolongations 11 and 12 and the frame beam 1 are strengthened by tie-bars T. Axles 14 and 16, parallel to the axles 7 and 8, are attached to the frame beam 1 at the ends 13 and 15 respectively. The axles 14 and 16 extend through the hubs 17 and 18 of the rake wheels 2 and 5, so that the rake wheels are freely rotatable upon their respective axles.

The hubs 17, 9, 10 and 18 of the rake wheels 2, 3, 4 and 5 respectively are substantially aligned.

The frame beam 6 is connected to a drawbar in the form of a shaft 19 which is rotatably but not slidably supported in a tube 20. The shaft 19 can be locked in the tube 20 in the position shown, by a locking pin 21, there being, however, sufficient play to allow the shaft 19 to turn through an angle of about 10° in either direction away from the illustrated position.

As shown in the drawing, the implement is coupled to a tractor 22 having at its rear end three links 23, 24 and 25 of a three-point lifting device 26. The lifting device 26 carries a fastening device 27 which is composed of two obliquely upwardly extending bars 28 and 29 rigidly connected to respective ends of an arcuate strip 30 and to two strips 31 and 32 which are themselves rigidly connected to a plate 33. The plate 33 carries a pin 34 about which a lug 35 is hingeable, the lug carrying the substantially horizontal tube 20. The forward end of the tube is provided with a locking device 36 which, when inoperative, can slide along the strip 30 when the tube 20 turns about the pin 34. The device 36 can be locked in one of a number of places on the strip 30 so as to prevent movement of the tube 20 about the pin 34.

In the drawing, the implement is shown occupying a position in which it will act as a swath turner. When the implement is raised a sufficient height from the ground with the aid of the lifting device 26 of the tractor 22 and the pin 21 is temporarily removed, the shaft 19 can be turned through 180° in the tube 20. If the implement is then lowered so that the rake wheels contact the ground, the implement occupies a position in which it can act as a side-delivery rake.

What we claim is:

1. An implement having a normal direction of travel and adapted for laterally displacing material lying on the ground, said implement comprising a main frame beam, rake wheels aligned in a row on one side of said main frame beam, each said wheel being positioned obliquely relative to said direction of travel, a secondary frame beam spaced from said main frame beam, said rake wheels being positioned between said frame beams, interconnecting members connecting said frame beams and having fixed relationship therewith, each said interconnecting member extending through and constituting a fixed axle for one of said rake wheels, and fixed axles on said main frame beam and supporting the remainder of said rake wheels, said rake wheels being freely rotatable on their respective axles.

2. An implement as claimed in claim 1 comprising a drawbar connected to said secondary frame beam.

References Cited in the file of this patent

UNITED STATES PATENTS

| | | |
|---|---|---|
| 2,447,354 | Morrill | Aug. 17, 1948 |
| 2,689,446 | Sorrels | Sept. 21, 1954 |
| 2,827,754 | Hill | Mar. 25, 1958 |
| 2,836,030 | Van der Lely et al. | May 27, 1958 |
| 2,876,613 | Van der Lely et al. | Mar. 10, 1959 |

FOREIGN PATENTS

| | | |
|---|---|---|
| 725,213 | Great Britain | Mar. 2, 1955 |